(12) United States Patent
Yamauchi et al.

(10) Patent No.: US 10,132,978 B2
(45) Date of Patent: Nov. 20, 2018

(54) POLARIZING ELEMENT, AND MANUFACTURING METHOD FOR POLARIZING ELEMENT

(71) Applicant: Mitsubishi Chemical Corporation, Chiyoda-ku (JP)

(72) Inventors: Koji Yamauchi, Yokohama (JP); Minoru Torigoe, Yokohama (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 406 days.

(21) Appl. No.: 14/757,527

(22) Filed: Dec. 23, 2015

(65) Prior Publication Data
US 2016/0195658 A1 Jul. 7, 2016

Related U.S. Application Data

(63) Continuation of application No. PCT/JP2014/066948, filed on Jun. 26, 2014.

(30) Foreign Application Priority Data

Jun. 27, 2013 (JP) .................................. 2013-134943
Dec. 26, 2013 (JP) .................................. 2013-269753

(51) Int. Cl.
*G02B 5/30* (2006.01)
*G02B 1/14* (2015.01)
(Continued)

(52) U.S. Cl.
CPC .............. *G02B 5/3083* (2013.01); *G02B 1/14* (2015.01); *G02B 5/3025* (2013.01); *G02B 5/201* (2013.01); *G02F 1/133528* (2013.01)

(58) Field of Classification Search
CPC ...... G02B 5/3025; G02B 5/3083; G02B 1/14; G02F 1/133528

(Continued)

(56) References Cited

U.S. PATENT DOCUMENTS 8,467,177 B2 *  6/2013  Mathew ............ G02F 1/133528
                                             349/62
9,075,199 B2 *  7/2015  Jiao .......................... G02B 5/30
(Continued)

FOREIGN PATENT DOCUMENTS

CN         1450389 A      10/2003
CN         1646589 A       7/2005
(Continued)

OTHER PUBLICATIONS

Combined Office Action and Search Report dated Mar. 24, 2017 in Chinese Patent Application No. 201480036564.9 (with English translation).

(Continued)

*Primary Examiner* — Frank Font
(74) *Attorney, Agent, or Firm* — Oblon, McClelland, Maier & Neustadt, L.L.P.

(57) ABSTRACT

The present invention has an object to provide a production method that can prevent side etching and delamination of an anisotropic dye coating formed by an application process, thereby providing a polarizing element that exhibits durable performance and rugged reliability and that is less affected by a solvent or the like used in a production process after formation of the anisotropic dye coating, which leads to improved flexibility of the production process. The present invention also provides a polarizing element that includes a substrate, an anisotropic dye coating, and a resin composition layer, wherein the anisotropic dye coating and the resin composition layer are sequentially layered on the substrate, wherein the top surface and all side surfaces of the anisotropic dye coating are covered with the resin composition layer, and wherein the anisotropic dye coating and the resin composition layer are not formed on portions of the substrate.

7 Claims, 10 Drawing Sheets

(51) Int. Cl.
G02B 5/20 (2006.01)
G02F 1/1335 (2006.01)

(58) Field of Classification Search
USPC .................. 359/483.01, 486.01; 349/96
See application file for complete search history.

(56) References Cited

U.S. PATENT DOCUMENTS

| | | | |
|---|---|---|---|
| 9,618,669 B2* | 4/2017 | Chen | G02B 5/305 |
| 9,690,024 B2* | 6/2017 | Jiao | G02B 5/3041 |
| 2002/0014470 A1 | 2/2002 | Okada et al. | |
| 2004/0027510 A1 | 2/2004 | Iijima et al. | |
| 2004/0151830 A1 | 8/2004 | Scarabelli et al. | |
| 2005/0118430 A1 | 6/2005 | Doi et al. | |
| 2008/0055521 A1* | 3/2008 | Mizutani | G02B 5/3016 349/96 |
| 2008/0259230 A1 | 10/2008 | Miyakita et al. | |
| 2009/0252898 A1 | 10/2009 | Tomita et al. | |
| 2010/0134726 A1* | 6/2010 | Morishima | C09K 19/22 349/97 |
| 2012/0075568 A1* | 3/2012 | Chang | G02B 5/3016 349/194 |
| 2014/0340865 A1* | 11/2014 | Hikmet | G02F 1/133533 362/19 |
| 2015/0160390 A1* | 6/2015 | Goyal | G02B 5/3033 348/552 |
| 2016/0103349 A1* | 4/2016 | Park | G02F 1/133512 349/42 |

FOREIGN PATENT DOCUMENTS

| | | |
|---|---|---|
| CN | 101139475 A | 3/2008 |
| CN | 101750662 A | 6/2010 |
| CN | 102053496 A | 5/2011 |
| JP | 2002-55227 A | 2/2002 |
| JP | 2003-302626 A | 10/2003 |
| JP | 2004-54031 | 2/2004 |
| JP | 2004-226830 A | 8/2004 |
| JP | 2004-534283 | 11/2004 |
| JP | 2004-348043 | 12/2004 |
| JP | 2005-52686 | 3/2005 |
| JP | 2007-163722 A | 6/2007 |
| JP | 2007-199661 | 8/2007 |
| JP | 2008-266842 A | 11/2008 |
| JP | 2009-237355 | 10/2009 |
| JP | 2009-244347 | 10/2009 |
| JP | 2011-82109 A | 4/2011 |
| TW | 514592 B | 12/2002 |

OTHER PUBLICATIONS

Office Action dated Dec. 19, 2017 in Japanese Patent Application No. 2015-524108 (with unedited computer generated English translation), 11 pages.
Office Action dated Jan. 19, 2018 in the corresponding Chinese Patent Application No. 201480036564.9 (with English Translation).
English Translation of International Search Report dated Oct. 7, 2014 in PCT/JP2014/066948, filed Jun. 26, 2014.
International Preliminary Report on Patentability and Written Opinion dated Jan. 7, 2016 in PCT/JP2014/066948.

* cited by examiner

POLARIZING ELEMENT, AND MANUFACTURING METHOD FOR POLARIZING ELEMENT

CROSS-REFERENCE TO RELATED APPLICATION

This is a continuation of International Application PCT/JP2014/066948, filed on Jun. 26, 2014, and designated the U.S., (and claims priority from Japanese Patent Application 2013-134943 which was filed on Jun. 27, 2013 and Japanese Patent Application 2013-269753 which was filed on Dec. 26, 2013,) the entire contents of which are incorporated herein by reference.

TECHNICAL FIELD

The present invention relates to a polarizer, more particularly a polarizing element including an anisotropic dye coating and a resin composition layer that are formed on a substrate, and a method for producing the polarizing element.

BACKGROUND ART

LCD (liquid crystal displays) use a linear polarizer and a circular polarizer to control the optical rotation and the birefringence in the display. OLED (organic EL elements) also use a circular polarizer to prevent external light reflection.

Conventionally, polarizing layers obtained by dissolving or adsorbing iodine or a dichroic organic dye in or to a polymer material such as polyvinyl alcohol and uniaxially stretching a film of the resultant to orient the dichroic dye have been widely used for the polarizers (polarizing elements). However, the conventional polarizing layers produced in the above manner have the problems of, for example, inadequate thermal resistance and inadequate light fastness depending on the dye and the polymer material used, and a low bonding yield of the polarizing layers in the production of a liquid crystal device. Attempts have been made to form a polarizing layer in a cell to achieve brightness enhancement by simplifying the structure of the elements.

Methods for applying a solution that includes a dichroic dye onto a substrate such as a glass sheet or a transparent film to form an anisotropic dye coating for use as a polarizing layer are also discussed. Examples of the methods for producing an anisotropic dye coating by such application process include a method of forming plural patterns on a single substrate. For example, a method of forming patterns by disposing a layer that includes a photocatalyst on a substrate and irradiating the layer with energy (Patent Document 1), a method of forming patterns by controlling application of an anisotropic dye coating by varying hydrophilization of a substrate (Patent Document 2), a method of forming patterns by selectively insolubilizing an anisotropic dye coating (Patent Document 3) have been proposed. A method of forming patterns by disposing a layer that includes a photosensitive resin layer on an optically anisotropic layer, exposing the layer through a certain mask, and developing the layer (Patent Document 4) has also been proposed.

RELATED ART DOCUMENTS

Patent Documents

Patent Document 1: Japanese Unexamined Patent Application Publication No. 2004-348043
Patent Document 2: Japanese Unexamined Patent Application Publication No. 2005-052686
Patent Document 3: Japanese Unexamined Patent Application Publication No. 2004-054031
Patent Document 4: Japanese Unexamined Patent Application Publication No. 2007-199661

SUMMARY OF THE INVENTION

Problems to be Solved by the Invention

However, in a case in which patterns are formed by a layer that includes a photocatalyst as in Patent Document 1, the action of the photocatalyst reduces the orientability, which may cause degradation of the properties as a polarizing element. In the method in Patent Document 2, the anisotropic dye coating remains on, for example, the bonding area of the substrate, which may adversely affect production of a panel. In the method in Patent Document 3, the insolubilized coating is washed before patterning the coating, which may lead to poor patterning accuracy. In addition, when insolubilization of the anisotropic dye coating is insufficient, the anisotropic dye coating may be peeled, for example, which may cause degradation of the properties as a polarizing element. Thus, there exists a need for a method for effectively patterning the coating while maintaining the properties as a polarizing element.

It is necessary that the anisotropic dye coating have, on its surface, a resin composition layer to, for example, provide mechanical strength to the anisotropic dye coating or to prevent dissolution of impurities from the anisotropic dye coating to another layer such as, for example, a liquid crystal layer. The resin composition layer also serves to protect the anisotropic dye coating from a solvent or water used in a production process after formation of the anisotropic dye coating.

In a case in which patterns are formed by photolithography as in Patent Document 4, unexposed areas of a photosensitive resin layer (resin composition layer) and an anisotropic dye coating are removed by a developer. The inventors of the present invention have found that in the removal process, a side surface of exposed areas of the anisotropic dye coating is subjected to a side etching by the developer. The side etching of the anisotropic dye coating tends to lead to delamination of the resin composition layer and the anisotropic dye coating, which causes the problems of significantly reduced performance and reliability of a polarizing element.

Even in a method of forming patterns by forming an anisotropic dye coating by continuous application onto a surface of a substrate, disposing a resin composition layer on the anisotropic dye coating by, for example, an application process, and removing unwanted portions by, for example, an etching process, a side surface of the anisotropic dye coating is exposed to the atmosphere, which causes the problems of side etching or delamination of the anisotropic dye coating by a solvent or water used in a production process after formation of the anisotropic dye coating.

In a case in which an anisotropic dye coating on a substrate is patterned by an insolubilization process as in Patent Document 3, and a resin composition layer is continuously applied onto the substrate, the resin composition layer is disposed in an area where a substrate is provided or an electrode is formed in assembly of a panel. Thus, it is necessary to further pattern the resin composition layer so that the composition layer does not affect provision of a substrate or formation of an electrode, which causes problems regarding production efficiency and costs.

To solve the above technical problems, the present invention has an object to provide a method for producing a polarizing element, that can prevent side etching and delamination of an anisotropic dye coating formed by an application process thereby providing a polarizing element that exhibits durable performance and rugged reliability, and that is less affected by a solvent or the like used in a production process after formation of the anisotropic dye coating, which leads to improved flexibility of the production process. The present invention also has an object to provide a polarizing element that can prevent side etching and delamination of an anisotropic dye coating formed by an application process thereby exhibiting durable performance and rugged reliability and that is less affected by a solvent or the like used in a production process after formation of the anisotropic dye coating.

Means of Solving the Problems

As a result of assiduous research intended to achieve the objects described above, the inventors of the present invention have found that an anisotropic dye coating that is disposed on a substrate and that is covered with a resin composition layer to prevent exposure of the coating to the atmosphere does not exhibit the side etching and the delamination and is less affected by the solvent or the like, thereby achieving the present invention. The inventors of the present invention have found that a polarizing element produced by forming an anisotropic dye coating on a substrate by a continuous application process, removing the anisotropic dye coating around the perimeter of a pattern, forming a resin composition layer on the anisotropic dye coatings by an application process, and removing unwanted portions includes the anisotropic dye coating that is covered with the substrate and the resin composition, that is not exposed to the atmosphere, that does not exhibit the side etching and the delamination, and that is not affected by the solvent or the like, thereby achieving the present invention. More particularly, the present invention includes the following aspects [1]-[7];

[1] A polarizing element that includes a substrate, an anisotropic dye coating, and a resin composition layer, wherein the anisotropic dye coating and the resin composition layer are sequentially layered on the substrate, wherein the top surface and all side surfaces of the anisotropic dye coating are covered with the resin composition layer, and wherein the anisotropic dye coating and the resin composition layer are not formed on portions of the substrate.

[2] The polarizing element according to [1], wherein the resin composition layer is not optically anisotropic.

[3] The polarizing element according to [1] or [2], wherein the resin composition layer has an optical transmission at a thickness of 500 nm and a wavelength of 550 nm of 80% or more.

[4] A method for producing a polarizing element that includes a substrate, an anisotropic dye coating, and a resin composition layer, the method including the following steps (1)-(4):

(1) a step of forming the anisotropic dye coating on the substrate, (2) a step of removing part of the anisotropic dye coating to form plural separate anisotropic dye coatings, (3) a step of forming the resin composition layer on the anisotropic dye coatings, and (4) a step of removing unwanted portions other than a portion of a pattern and a portion around the perimeter of the pattern, after formation of the resin composition layer.

[5] The method for producing a polarizing element according to [4], wherein the step (3) of forming the resin composition layer is performed by continuously applying a resin composition onto a surface of the substrate.

[6] The method for producing a polarizing element according to [4] or [5], wherein the resin composition is a photosensitive resin composition.

[7] The method for producing a polarizing element according to any of [4]-[6], wherein the step (4) of removing unwanted portions is performed by photolithography.

Effects of the Invention

The polarizing element of the present invention is less affected by, for example, an etching step in a production process and exhibits durable performance and rugged reliability.

The method for producing a polarizing element of the present invention can provide an anisotropic dye coating that is less affected by, for example, a solvent used in a production process after formation of the anisotropic dye coating, and thus the method is useful for producing a polarizing element for a liquid crystal display, an organic light-emitting diode, and the like and is especially useful for producing an in-cell polarizer, which involves use of a solvent (n-methylpyrrolidone) for forming an oriented film or water as a wash solvent after formation of the anisotropic dye coating.

DESCRIPTION OF THE EMBODIMENTS

Figure 1:
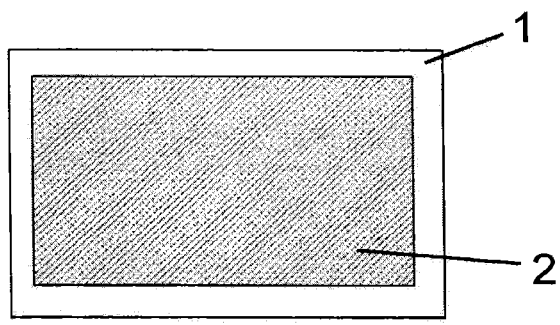
FIG. 1 schematically illustrates formation of an anisotropic dye coating in Embodiment 1.

Now, representative embodiments for carrying out the present invention will be specifically described, although the present invention is not limited to the following embodiments, and various modifications may be made without departing from the spirit of the present invention.

The present invention provides a polarizing element that includes a substrate, an anisotropic dye coating, and a resin composition layer and a method for producing the polarizing element.

(Polarizing Element)

The polarizing element of the present invention includes a substrate, an anisotropic dye coating, and a resin composition layer. The anisotropic dye coating and the resin composition layer are sequentially layered on the substrate. More particularly, the polarizing element includes the anisotropic dye coating on the substrate obtained by a continuous application process and the resin composition layer disposed on the anisotropic dye coating, sequentially. In addition to the anisotropic dye coating and the resin composition layer, the polarizing element may include another layer for the purpose of, for example, improving the ability to polarize light or increasing the mechanical strength. For example, the polarizing element may include another layer between the substrate and the anisotropic dye coating or between the anisotropic dye coating and the resin composition layer.

In the present invention, the term pattern refers to a pattern of the anisotropic dye coating formed on the substrate, and the term perimeter of the pattern refers to a line that indicates the shape of the pattern of the anisotropic dye coating.

In the polarizing element of the present invention, the top surface and all side surfaces of the anisotropic dye coatings are covered with the resin composition layer, and the anisotropic dye coating and the resin composition layer are not formed on portions of the top surface of the substrate.

The top surface and all side surfaces of the anisotropic dye coatings are covered with the resin composition layer, and thus the present invention can solve the problem of the side etching and can provide a highly reliable polarizing-element. The anisotropic dye coating and the resin composition layer are not formed on portions of the substrate, and thus, in assembly of a panel, substrates are easily bonded to each other, and an electrode is easily formed, which improves the production yield of the polarizing element. The areas where the substrates are bonded to each other and the area where an electrode is formed can have, for example, increased peel strength, which results in improved reliability of the polarizing element and the panel.

The polarizing element may have the portions in which the anisotropic dye coating and the resin composition layer are not formed, at any ratio, and the ratio can be adjusted appropriately depending on a desired size of the polarizing element and the panel, a size and cohesive strength of an adhesive material for bonding substrates, electrode wires, and the width of a tape for points at which electrode wires exit, and the like.

In another aspect of the present invention, the polarizing element includes plural independent anisotropic dye coatings formed on a substrate, wherein the top surface and all side surfaces of the plural anisotropic dye coatings are covered with a resin composition layer.

The term independent means that the plural anisotropic dye coatings are discontinuous relative to each other, that is, that an anisotropic dye coating and a resin composition layer are not disposed between the anisotropic dye coatings.

All of the plural anisotropic dye coatings may have a same shape, or some of the plural anisotropic dye coatings may have a different shape. From the viewpoint of productivity, all of the plural anisotropic dye coatings preferably have a same shape. The anisotropic dye coatings may have any shape, and the anisotropic dye coatings preferably have a rectangular shape from the viewpoint of productivity. The term plural refers to 2 or more, and the number may be adjusted appropriately depending on a size of a substrate to be used and a desired size of a polarizing element.

To prevent side etching of the anisotropic dye coating, the resin layer that covers the anisotropic dye coatings, especially the resin layer that covers the side surfaces of the anisotropic dye coatings preferably has a thickness of 20 nm or more and more preferably 50 nm or more and preferably 2000 nm or less and more preferably 1000 nm or less.

Examples of a method for producing the polarizing element of the present invention include, but not limited to, a method described below.

(Substrate)

The substrate in the present invention preferably has good surface properties, contact angle properties, and water absorption properties, although not limited thereto. Examples of a material for the substrate can include inorganic materials such as glass; and polymer materials such as triacetate resins, acrylic resins, polyester resins, polycarbonate resins, polyethylene terephthalate resins, triacetyl cellulose resins, norbornene resins, cyclic polyolefin resins, and urethane resins. These materials may be used alone or in combination of two or more thereof. Especially preferably, the substrate includes a polymer material.

The substrate generally has a water absorption of 5% or less, preferably 3% or less, and more preferably 1% or less. If the substrate had an excessively large water absorption, the substrate would absorb moisture and warp during formation of a coating of an anisotropic polarizing material by a wet coating process, which might cause a coating defect. And after formation of the anisotropic dye coating by an application process, the substrate might swell, which might cause an optical defect.

As used herein, "water absorption" is determined by measuring weight change after immersion in water at 23° C. for 4 hours using the test method of ASTM D570.

A substrate surface for forming the anisotropic dye coating can be provided with, for example, a layer treated to better induce an alignment, in a certain direction, of an anisotropic polarizing material such as a dye included in the anisotropic dye coating. The treated layer can be formed in accordance with a known method such as that described at pages 226-239 in "*Ekisho Binran*" (Maruzen Co., Ltd., Oct. 30, 2000).

The substrate may be a film (a discrete sheet) of a particular size or a continuous film (long strip). The substrate usually has a film thickness of 0.01 mm-3 mm and preferably 0.02 mm-2 mm.

The substrate usually has a total optical transmission of 80% or more, preferably 85% or more, and more preferably 90% or more. As used herein, the term "total optical transmission" is determined using a spectrophotometer with an integrating sphere, and is the sum of diffuse and specular optical transmission.

(Anisotropic Dye Coating)

The anisotropic dye coating in the present invention is an optical coating that exhibits anisotropy in electromagnetic properties in two directions selected from the three directions of the thickness direction of the coating and any two in-plane directions orthogonal to the thickness direction that define a three-dimensional coordinate system. Examples of the electromagnetic properties include optical properties such as absorbance and refractivity and electric properties such as resistance and capacitance.

The anisotropic dye coating in the present invention includes a dye, which may be any material as long as the coating can exhibit the anisotropy as described above. In addition to the dye, the anisotropic dye coating may optionally include a binder resin, a monomer, a curing agent, an additive, and the like.

(Dye)

The dye used in the present invention is a dichroic dye. Preferably, the dye exhibits a liquid crystalline phase so as to control the orientation. As used herein, a dye exhibiting a liquid crystalline phase means that the dye forms a lyotropic liquid crystalline phase in a solvent.

The dye used in the present invention is preferably soluble in water or an organic solvent and more preferably soluble in water so that the dye can be applied to form the anisotropic dye coating. More preferably, the dye is a compound having an inorganicity that is smaller than its organicity, as defined in "*Yuki Gainenzu—Kiso to Oyo*" (Koda, Yoshio, Sankyo Publishing Co., Ltd., 1984). The dye in free form but not in a salt form preferably has a molecular weight of 200 or more and particularly preferably 300 or more and preferably 1500 or less and particularly preferably 1200 or less. The term "soluble in water" means that usually 0.1% by weight or more and preferably 1% by weight or more of a compound is dissolved in water at room temperature.

Specific examples of the dye include azo dyes, stilbene dyes, cyanine dyes, phthalocyanine dyes, and condensed polycyclic dyes (such as perylene and oxazine dyes). Among them, azo dyes are preferred as the azo dyes can have high molecular alignment in the anisotropic dye coating. The azo dyes refer to dyes having at least one azo group. The number of azo groups per molecule is preferably 2 or more, more preferably 6 or less, and still more preferably 4 or less from the viewpoint of color and productivity.

In the present invention, any known dye may be used.

Examples of the dye include those described in, for example, Japanese Translation of PCT International Application Publication No. JP-T-H08-511109, Japanese Unexamined Patent Application Publication No. H09-230142, Japanese Unexamined Patent Application Publication No. 2006-079030, Japanese Unexamined Patent Application Publication No. 2007-302807, Japanese Unexamined Patent Application Publication No. 2007-272211, Japanese Unexamined Patent Application Publication No. 2007-186428, Japanese Unexamined Patent Application Publication No. 2008-69300, Japanese Unexamined Patent Application Publication No. 2008-081700, Japanese Unexamined Patent Application Publication No. 2009-169341, Japanese Unexamined Patent Application Publication No. 2009-161722, Japanese Unexamined Patent Application Publication No. 2009-173849, Japanese Unexamined Patent Application Publication No. 2010-039154, Japanese Unexamined Patent Application Publication No. 2010-168570, Japanese Unexamined Patent Application Publication No. 2010-180314, Japanese Unexamined Patent Application Publication No. 2010-266769, Japanese Unexamined Patent Application Publication No. 2011-012152, Japanese Unexamined Patent Application Publication No. 2011-016922, Japanese Unexamined Patent Application Publication No. 2010-100059, Japanese Unexamined Patent Application Publication No. 2011-141331, Japanese Translation of PCT International Application Publication No. JP-T-2001-504238, and Japanese Unexamined Patent Application Publication No. 2006-48078.

The dye may be used in the form of a free acid, or may include an acidic group converted to a salt form. The dye may also be a combination of a dye in salt form and a dye in a free acid. A dye produced in salt form may be used without modification, or a dye may be converted to a desired salt form. A dye can be converted to a salt form by any know method, including, for example, the following methods:

1) A strong acid such as hydrochloric acid is added to an aqueous solution of a dye produced in a salt form, and the dye is allowed to precipitate in the form of a free acid. Then, the acidic groups of the dye are neutralized with an alkali solution that includes a desired counter ion (for example, an aqueous lithium hydroxide solution) to perform a salt exchange.

2) A large excess of a neutral salt that includes a desired counter ion (for example, lithium chloride) is added to an aqueous solution of a dye produced in a salt form to perform a salt exchange in the form of a salted-out cake.

3) An aqueous solution of a dye produced in a salt form is treated with a strongly acidic cation exchange resin, and the dye is allowed to precipitate in the form of a free acid. Then, the acidic group of the dye is neutralized with an alkali solution that includes a desired counter ion (for example, an aqueous lithium hydroxide solution) to perform a salt exchange.

4) An aqueous solution of a dye produced in a salt form is treated with a strongly acidic cation exchange resin that is pre-treated with an alkali solution that includes a desired counter ion (for example an aqueous lithium hydroxide solution) to perform a salt exchange.

Whether the acidic groups of the dye are in a free acid or in a salt form depends on pKa of the dye and the pH of the aqueous dye solution.

Examples of the salt form include salts of alkali metals such as Na, Li, and K, ammonium salts optionally substituted with an alkyl group or a hydroxyalkyl group, and salts of organic amines. Examples of the organic amines include $C_{1-6}$ lower alkylamines, hydroxy-substituted $C_{1-6}$ lower alkylamines, and carboxy-substituted $C_{1-6}$ lower alkylamines. In a case in which the acidic groups are in a salt form, the acidic groups may be in a single salt form or in a combination of two or more thereof.

In the present invention, the dye may be used alone or in combination of two or more. A dye other than those listed above can also be added as long as the dye does not impair the orientation. This allows production of an anisotropic dye coating that has various hues.

When another dye is added, examples of the another dye include C.I. Direct Yellow 12, C.I. Direct Yellow 34, C.I. Direct Yellow 86, C.I. Direct Yellow 142, C.I. Direct Yellow 132, C.I. Acid Yellow 25, C.I. Direct Orange 39, C.I. Direct Orange 72, C.I. Direct Orange 79, C.I. Acid Orange 28, C.I. Direct Red 39, C.I. Direct Red 79, C.I. Direct Red 81, C.I. Direct Red 83, C.I. Direct Red 89, C.I. Acid Red 37, C.I. Direct Violet 9, C.I. Direct Violet 35, C.I. Direct Violet 48, C.I. Direct Violet 57, C.I. Direct Blue 1, C.I. Direct Blue 67, C.I. Direct Blue 83, C.I. Direct Blue 90, C.I. Direct Green 42, C.I. Direct Green 51, and C.I. Direct Green 59.

(Resin Composition Layer)

In the present invention, any resin composition layer may be used as long as the layer does not impair an effect of the present invention, and the resin composition layer is preferably not optically anisotropic, so as not to impair the performance of the anisotropic dye coating.

In the present invention, the term optically anisotropic means that the resin composition layer exhibits anisotropy in electromagnetic properties in two directions selected from the three directions of the thickness direction of the resin composition layer and any two in-plane directions orthogonal to the thickness direction that define a three-dimensional coordinate system.

The resin composition used for the resin composition layer in the present invention preferably has an optical transmission at a thickness of 500 nm and a wavelength of 550 nm of 80% or more, more preferably 85% or more, and particularly preferably 90% or more, so as not to prevent degradation of an optical property of the anisotropic dye coating. Although the upper limit is not critical, a higher optical transmission is preferred.

The resin composition used for the resin composition layer in the present invention may include, for example, a monomer, a resin, a surfactant, a polymerization initiator, an adhesion enhancer, and a solvent.

Examples of the resin included in the resin composition layer in the present invention include photosensitive resins that are formed of, for example, a photopolymerizable monomer; thermoplastic resins such as acrylic resins, urethane resins, polyester resins, nylon resins, polyimide resins, and polycarbonate resins; and thermosetting resins such as epoxy resins, phenol resins, and melamine resins.

Any photosensitive resin may be used in the present invention, and the photosensitive resin is preferably formed of a photopolymerizable monomer, from the viewpoint of, for example, sensitivity.

Examples of the photopolymerizable monomer can include compounds that have at least one ethylenically unsaturated group in the molecule (hereinafter sometimes referred to as "ethylenic monomer"). More particularly, the examples include (meth)acrylates, (meth)acrylic acid alkyl esters, acrylonitrile, styrene, monoesters of a carboxylic acid and a polyhydric or monohydric alcohol that have one ethylenically unsaturated bond, and multifunctional ethylenic monomers that have two or more ethylenically unsaturated group per molecule.

Examples of the photosensitive resins may include resins that have an ethylenic double bond in the side chain. Such resins exhibit high sensitivity during formation of a resin composition layer by application, drying, and exposure processes, and thus such resins can form a layer having high mechanical strength such as high indentation hardness and high scratch hardness after curing, low surface roughness (a high surface roughness may adversely affect light scattering and a lamination process after formation of the resin composition layer), and very few defects such as pinholes. Thus, any resin may be used as long as the resin has an ethylenic double bond in the side chain.

The resin usually has a weight average molecular weight (Mw) relative to polystyrene standards of 1,000 or more and preferably 1,500 or more and usually 20,000 or less and preferably 15,000 or less, as determined by gel permeation chromatography (GPC). The resin does not have an excessively small weight average molecular weight, and thus the resin tends to exhibit improved or maintained sensitivity and improved or maintained layer-strength. And the resin does not have an excessively large weight average molecular weight, and thus the resin tends to avoid the problems of, for example, remelting and a foreign material.

Among the resins that have an ethylenic double bond in the side chain, epoxy (meth)acrylate resins that have a carboxyl group are particularly desirable for mechanical strength, water resistance, and solvent resistance.

The photosensitive resins may include a photopolymerization initiator. The photopolymerization initiator functions to directly absorb light, cause decomposition or hydrogen abstraction, and generate a polymerization-active radical. The photopolymerization initiator may optionally include an additional agent such as a sensitizing dye.

Examples of the photopolymerization initiator include metallocene compounds including titanocene compounds described in Japanese Unexamined Patent Application Publication No. S59-152396 and Japanese Unexamined Patent Application Publication No. S61-151197; hexaarylbiimidazole derivatives described in Japanese Unexamined Patent Application Publication No. 2000-56118; halomethylated oxadiazole derivatives described in Japanese Unexamined Patent Application Publication No. H10-39503; halomethyl-s-triazine derivatives; N-aryl-$\alpha$-amino acids such as N-phenylglycine; radical activators such as N-aryl-$\alpha$-amino acid salts and N-aryl-$\alpha$-amino acid esters; $\alpha$-aminoalkylphenone derivatives; and oxime ester derivatives described in, for example, Japanese Unexamined Patent Application Publication No. 2000-80068 and Japanese Unexamined Patent Application Publication No. 2006-36750.

Examples of the thermoplastic resin in the present invention include, but not limited to, acrylic resins, urethane resins, polyester resins, nylon resins, polyamide resins, polyimide resins, polycarbonate resins, polyolefin resins, cellulose resins, polyarylate resins, polystyrene resins, polyvinyl alcohol resins, polyvinyl chloride resins, butyral resins, styrene-maleic acid copolymers, chlorinated polyethylenes, chlorinated polypropylenes, vinyl chloride-vinyl acetate copolymers, and polyvinyl acetates. These may be used in alone or in combination thereof. The thermoplastic resin may include another component such as a modifier as long as the component does not impair an effect of the present invention.

Examples of the acrylic resins that can be used include various polymer compounds described in, for example, Japanese Unexamined Patent Application Publication No. H7-207211, Japanese Unexamined Patent Application Publication No. H8-259876, Japanese Unexamined Patent Application Publication No. H10-300922, Japanese Unexamined Patent Application Publication No. H11-140144, Japanese Unexamined Patent Application Publication No. H11-174224, Japanese Unexamined Patent Application Publication No. 2000-56118, Japanese Unexamined Patent Application Publication No. 2003-233179, and Japanese Unexamined Patent Application Publication No. 2007-270147. More particularly, the examples include resins obtained by addition of an unsaturated monobasic acid to at least part of an epoxy group in a copolymer of (meth)acrylates that include an epoxy group with another radically polymerizable monomer and resins obtained by addition of a polybasic acid anhydride to at least part of the hydroxyl group generated by the addition reaction; linear alkali-soluble resins that include a carboxyl group in the backbone; resins obtained by addition of an unsaturated compound that includes an epoxy group to a carboxyl group moiety in a linear alkali-soluble resin that includes a carboxyl group in the backbone; and (meth)acrylic resins.

Examples of the urethane resins that can be used include various polymer compounds described in, for example, Japanese Unexamined Patent Application Publication No. H2-158633 and Japanese Unexamined Patent Application Publication No. 2011-5846.

Usually, urethane resins are produced by reaction between a polyol and an isocyanate. Examples of the polyol include polycarbonate polyols, polyester polyols, polyether polyols, polyolefin polyols, and acrylic polyols.

Examples of the isocyanate include aromatic diisocyanates such as tolylene diisocyanate, xylylene diisocyanate, methylene diphenyl diisocyanate, phenylene diisocyanate, naphthalene diisocyanate, and tolidine diisocyanate, aliphatic diisocyanates having an aromatic ring such as $\alpha,\alpha,\alpha',\alpha'$-tetramethylxylylene diisocyanate; aliphatic diisocyanates such as methylene diisocyanate, propylene diisocyanate, lysine diisocyanate, trimethyl hexamethylene diisocyanate, and hexamethylene diisocyanate; and alicyclic diisocyanates such as cyclohexane diisocyanate, methylcyclohexane diisocyanate, isophorone diisocyanate, dicyclohexylmethane diisocyanate, and isopropylidene dicyclohexyl diisocyanate.

These may be used alone or in combination thereof.

Examples of the thermosetting resins in the present invention include, but not limited to, epoxy resins, phenol resins, benzoguanamine resins, rosin-modified maleic resins, rosin-modified fumaric resins, phenol resins, melamine resins, and urea resins.

Examples of the epoxy resins include bisphenol epoxy resins such as bisphenol A epoxy resins, bisphenol F epoxy resins, and bisphenol S epoxy resins; biphenol epoxy resins; alicyclic epoxy resins; aliphatic linear epoxy resins; glycidyl ester epoxy resins; compounds obtained by glycidyl etherification of a condensate of a phenol compound such as phenol, cresol, alkylphenol, catechol, bisphenol F, bisphenol A, bisphenol S, or fluorene bisphenol and an aldehyde compound such as formaldehyde or salicylaldehyde; compounds obtained by glycidyl etherification of a difunctional phenol; compounds obtained by glycidyl etherification of a dihydric alcohol; and compounds obtained by glycidyl etherification of a polyphenol; and hydrogenated derivatives and halides thereof.

To cure the thermosetting resins, any curing agent may be used as long as the agent functions to cure the resins, and examples of the curing agent include the followings:

acid anhydrides: aromatic acid anhydrides such as pyromellitic anhydride; and cyclic aliphatic acid anhydrides such as tetrahydrophthalic anhydride, methyltetrahydrophthalic anhydride, hexahydrophthalic anhydride, methylhexahydrophthalic anhydride, methylendomethylenetetrahydrophthalic anhydride, dodecenyl succinic anhydride, and trialkyltetrahydrophthalic anhydride;

imidazoles: imidazole, 2-ethylimidazole, 2-ethyl-4-methylimidazole, 2-phenylimidazole, 2-undecylimidazole, 1-benzyl-2-methylimidazole, 2-heptadecylimidazole, 4,5-diphenylimidazole, and the like;

amines: aliphatic and alicyclic amines such as bis(4-aminocyclohexyl)methane, bis(aminomethyl)cyclohexane, m-xylylenediamine, and 3,9-bis(3-aminopropyl)-2,4,8,10-tetraspiro[5,5]undecane; aromatic amines such as methaphenylenediamine, diaminodiphenylmethane, and diaminodiphenylsulfone; tertiary amines such as benzyldimethylamine, 2,4,6-tris(dimethylaminomethyl)phenol, and 1,8-diazabicyclo-(5,4,0)-undecen-7,1,5-azabicyclo-(4,3,0)-nonen-7, and salts thereof;

s-triazines: halomethyl-s-triazines such as 2-(4-methoxyphenyl)-4,6-bis(trichloromethyl)-s-triazine, 2-(4-methoxynaphthyl)-4,6-bis(trichloromethyl)-s-triazine, 2-(4-ethoxynaphthyl)-4,6-bis(trichloromethyl)-s-triazine, and 2-(4-ethoxycarbonylnaphthyl)-4,6-bis(trichloromethyl)-s-triazine; and polyhydric phenols: catechol, resorcin, hydroquinone, bisphenol F, bisphenol A, bisphenol S, biphenols, phenol novolacs, cresol novolacs, novolacs prepared from a dihydric phenol such as bisphenol A, trishydroxyphenylmethanes, aralkylpolyphenols, and dicyclopentadienepolyphenols.

Examples of the curing agent other than those listed above include phosphonium salts; organic phosphine compounds and salts thereof; and metal soaps such as zinc octylate and tin octylate.

These curing agents may be used alone or in combination of two or more thereof.

When an epoxy resin is used, an acid anhydride is preferred, as the acid anhydride readily condenses with epoxy and provides good water resistance and solvent resistance. A combination of an acid anhydride and an imidazole is preferred for condensability, water resistance, and solvent resistance.

The resin composition layer in the present invention can include a surfactant to improve, for example, wettability and application properties.

Examples of the surfactant that can be used include various surfactants such as anionic, cationic, nonionic, and amphoteric surfactants. Among them, the nonionic surfactants are preferred, as the nonionic surfactants are less likely to adversely affect the properties. Among them, fluorinated and silicone surfactants are beneficial in the application properties.

Examples of the fluorinated surfactants include perfluoroalkylsulfonic acids, perfluoroalkylcarboxylic acids, and fluorotelomer alcohols. Examples of the silicone surfactants include various linear and branched polyether-modified silicones.

The resin composition layer in the present invention can include, for example, a silane coupling agent and a phosphoric acid adhesion enhancer to improve adhesion of the resin composition layer.

Example of the silane coupling agent include epoxy-, (meth)acrylic-, and amino-silane coupling agents. These agents may be used alone or in combination of two or more thereof.

The method for producing a polarizing element of the present invention includes at least the following steps (the first, second, third, and fourth steps are hereinafter sometimes referred to as "step (1)", "step (2)", "step (3)", and "step (4)", respectively):

(1) a step of forming an anisotropic dye coating on a substrate;

(2) a step of removing part of the anisotropic dye coating to form plural separate anisotropic dye coatings;

(3) a step of forming a resin composition layer on the anisotropic dye coatings; and (4) a step of removing unwanted portions other than a portion of a pattern and a portion around the perimeter of the pattern, after formation of the resin composition layer.

It is only necessary that the method of the present invention include the steps (1)-(4). For example, each of the steps may be performed at any number of times. Although the steps (1)-(4) are preferably performed in the order described above, the method may include an additional step between the steps. For example, the method may include an additional step between the step (2) and the step (3). In the method for producing a polarizing element of the present invention, the step (1) may be performed again after the step (1) and the step (2).

(Step (1) of Forming Anisotropic Dye Coating)

The method of the present invention includes the step (1) of forming an anisotropic dye coating on a surface of a substrate. Preferably, the anisotropic dye coating is formed by continuously applying a dye-containing composition for forming the anisotropic dye coating. The term continuously apply refers to continuous application of the composition to form plural patterns and/or perimeter of the patterns, but does not refer to intermittent application of the composition to form patterns separately. When plural patterns are formed on a substrate, the application method can be selected as desired depending on the size of the substrate and the application device, and examples of the method include continuous application to form patterns at one time, application to form plural patterns separately.

The composition for forming the anisotropic dye coating in the present invention may be any composition as long as the composition includes a dye and exhibits anisotropy. Preferably, the composition includes a dye and a solvent so that the anisotropic dye coating is formed on the substrate by an application process. The composition may be in the form of a solution, a gel, or a dispersion of the dye and the like in a solvent. In addition, the composition may optionally include a binder resin, a monomer, a curing agent, and an additive.

The dye used in the step may be a dye as described in the section on the configuration of the polarizing element.

Preferably, the composition for forming the anisotropic dye coating exhibits a liquid crystalline phase so that the anisotropic dye coating formed after evaporation of the solvent exhibits high quality alignment. As used herein, the term liquid crystalline phase refers to the state described at pages 1-16 in "*Ekisho No Kiso to Oyo*" (Matsumoto, Shoichi and Ichiyoshi, Kakuta, 1991). Particularly preferably, the anisotropic dye coating exhibits a nematic phase described at page 3 in the literature.

(Solvent in Composition for Forming Anisotropic Dye Coating)

Suitable examples of the solvent include water, water-miscible organic solvents, and combinations thereof. Specific examples of the organic solvents include alcohols such as methyl alcohol, ethyl alcohol, isopropyl alcohol, and glycerin; glycols such as ethylene glycol and diethylene glycol; and cellosolves such as methyl cellosolve and ethyl cellosolve, and they may be used alone or in combination of two or more thereof.

(Concentration of Dye in Composition for Forming Anisotropic Dye Coating)

The dye is preferably included in the composition for forming the anisotropic dye coating at a concentration of 0.01% by weight or more and more preferably 0.1% by weight or more and preferably 50% by weight or less and more preferably 30% by weight or less, depending on conditions for forming the coating. The dye is not included at an excessively low concentration, and thus the resultant anisotropic dye coating can exhibit adequate anisotropy such as a high dichroic ratio. The dye is not included at an excessively high concentration, and thus the composition does not have an excessively high viscosity, which ensures a uniform and thin coating, and the dye tends to be prevented from being separated in the composition for forming the anisotropic dye coating.

(Additive in Composition for Forming Anisotropic Dye Coating)

The composition for forming the anisotropic dye coating may optionally include an additive such as a surfactant, a leveling agent, a coupling agent, and a pH adjusting agent. The additive may lead to, for example, improved wettability and improved application-properties.

Any anionic, cationic, and nonionic surfactants may be used. Although the surfactant may be included at any concentration, the surfactant is preferably included in the composition for forming the anisotropic dye coating at a concentration of 0.05% by weight or more and 0.5% by weight or less so that the surfactant has sufficient effect as an additive and does not hinder molecular orientation.

To reduce instability such as salification and aggregation of the dye in the composition for forming the anisotropic dye coating, a pH adjusting agent such as known acids and alkalis may be added before, after, or during mixing of the ingredients of the composition for forming the anisotropic dye coating. In addition to the additives described above, a known additive described in "*Additive for Coating*" (edited by J. Bieleman, Willey-VCH (2000)) can be used.

Examples of a method for applying the composition for forming the anisotropic dye coating to form the anisotropic dye coating include, but not limited to, a method described at pages 253-277 in "*Coating Kogaku*" by Harasaki, Yuji (Asakura Publishing Co., Ltd., Mar. 20, 1971), a method described at pages 118-149 in "*Bunshi Kyocho Zairyo no Sosei to Ohyo*" edited by Ichimura, Kunihiro (CMC Publishing Co., Ltd., Mar. 3, 1998), and a method of applying the composition to a substrate that has a stepped structure (and that may be pre-treated to induce an alignment) by, for example, slot die coating, spin coating, spray coating, bar coating, roll coating, blade coating, curtain coating, fountain coating, or dip coating. Among the coating techniques, slot die coating is suitable, as the technique can provide a highly uniform anisotropic dye coating.

(Step (2) of Removing Anisotropic Dye Coating around Perimeter of Anisotropic Dye Coating Pattern)

The method of the present invention includes the step (2) of removing part of the anisotropic dye coating after formation of the anisotropic dye coating to form plural separate anisotropic dye coatings. More particularly, the method includes a step of removing the anisotropic dye coating around the perimeter of the pattern of the anisotropic dye coating from the substrate. After removal of the anisotropic dye coating around the perimeter of the pattern, a resin composition is applied to the removal part to form a resin composition layer as described below, and thus the side surfaces of the anisotropic dye coatings are covered with the resin composition. This can prevent side etching and delamination of the anisotropic dye coatings and can maintain the performance and the reliability of a polarizing element. And the anisotropic dye coatings are less likely to be affected by, for example, a solvent used in a production process after formation of the anisotropic dye coatings, which improves the flexibility of the production process.

The anisotropic dye coating around the perimeter of the pattern of the anisotropic dye coating may be removed from the substrate by any method, and the method may be selected as desired depending on, for example, the size of the pattern and the production process. And the anisotropic dye coating around the perimeter of the pattern may be removed any time and may be removed before or after application and drying of the composition for forming the anisotropic dye coating, according to the removal method employed.

The region of the coating removed may have any area, and it is desired to remove an area so as to ensure adequate adhesion between the resin composition and the substrate. For example, regions of the anisotropic dye coating that are outside of the pattern on the adjacent substrate may be entirely removed, or regions of the anisotropic dye coating that are outside of the pattern on the adjacent substrate may be partially left. The smaller the area of the coating removed, the more desirably it is for production efficiency.

Specific examples of a method for removing the coating include wiping using a wipe and a solvent, abrasion using, for example, an abrasive tape or a blade, a nozzle method using a combination of a solvent discharge nozzle and a suction nozzle, and laser ablation by laser radiation. Among them, the wiping is preferred, as the removed anisotropic dye coatings are less likely to cause particle defects. The nozzle method and the laser ablation are also preferred, as the processes are performed without contact with the substrate and thus are less likely to affect other layers.

(Insolubilization of Anisotropic Dye Coatings)

The anisotropic dye coatings obtained as described above may be insolubilized. The coatings may be insolubilized after the step (1) or after the step (2).

The insolubilization refers to a process for reducing the solubility of a compound in a coating to prevent dissolution of the compound from the coating, thereby improving the stability of the coating. Specific examples of the process include a process of replacing a lower-valent ion with a higher-valent ion (for example, replacing a monovalent ion with a multivalent ion). The process includes known steps as those described, for example, at pages 435-437 in "*Riron Seizo Senryo Kagaku*" by Hosoda, Yutaka (Gihodo Shuppan Co., Ltd., 1957). Preferably, the anisotropic dye coatings obtained is treated by the process described in Japanese Unexamined Patent Application Publication No. 2007-241267 to render the coatings water-insoluble, from the viewpoint of, for example, ease of a subsequent steps and durability.

(Step (3) of Forming Resin Composition Layer)

The method for producing a polarizing element of the present invention includes the step (3) of forming a resin composition layer on the anisotropic dye coatings after removal of the anisotropic dye coating around the perimeter of the pattern of the anisotropic dye coating from the substrate. The resin composition layer may be formed by any method as long as the top surface and the side surfaces of the anisotropic dye coatings are covered with a resin composition. Particularly, it is preferred to apply a resin composition to form the resin composition layer for ease of formation of the layer and stability.

In the present invention, the composition may be applied as desired by any known method depending on the area to be applied, the application device, and the properties of the resin composition to be applied. Specific examples of the method include slot die coating, spin coating, spray coating, bar coating, roll coating, blade coating, curtain coating, fountain coating, dip coating, and printing processes such as offset printing, gravure printing, flexographic printing, screen printing, and inkjet printing. When the composition is applied to the entire surface, slot die coating is preferred for, for example, highly uniform application and high utilization efficiency of the liquid material. When the composition is applied to part of the surface, offset printing or the like is preferred for high patterning-accuracy.

The resin composition in the present invention can include a resin material as described in the above section on the configuration of the polarizing element. The resin material is used in the form of a solution or dispersion in, for example, an organic solvent.

Preferably, the organic solvent is selected from those having a boiling point ranging from 100 to 300° C. as measured at a pressure of 1013.25 [hPa]. (In the following disclosure, all boiling points are measured at the same pressure.) More preferably, the solvent has a boiling point of 120-280° C.

The organic solvent is selected from, for example, glycol monoalkyl ethers; glycol dialkyl ethers; glycol diacetates; alkyl acetates; ethers; ketones; monohydric and polyhydric alcohols; aliphatic hydrocarbons; alicyclic hydrocarbons; aromatic hydrocarbons; linear and cyclic esters; alkoxy carboxylic acids; halogenated hydrocarbons; ether ketones; and nitriles. They may be used alone or in combination of two or more thereof.

In application processes such as spin coating and die coating as described below, the organic solvent is preferably selected from those having a boiling point ranging from 100 to 200° C. and more preferably from 120 to 170° C. A solvent that does not have an excessively low boiling point can prevent, for example, uneven application, while a solvent that does not have an excessively high boiling point tends to allow drying of the composition without overburdening the anisotropic dye coatings and the resin composition layer.

Among the above organic solvents, glycol alkyl ether acetates such as propylene glycol monomethyl ether acetate are preferred due to its application properties, good balance of, for example, surface tension, and its relatively high ability to dissolve the components of the composition.

Like the anisotropic dye coating, the resin composition may be continuously applied to a surface of the substrate or may be intermittently applied to the substrate at spaced-apart locations. For example, the composition may be applied only onto the region of the anisotropic dye coating and the region around the perimeter of the pattern from which the anisotropic dye coating are removed, or may be applied to the substrate portions other than the region at the same time. The composition may be applied to all or part of the region of the anisotropic dye coating and the region around the perimeter of the pattern from which the anisotropic dye coating are removed, as long as the side surfaces of the anisotropic dye coatings are covered with the resin composition.

Usually, the resin composition layer preferably has a dried film thickness of 20 nm or more and more preferably 50 nm or more and preferably 2000 nm or less and more preferably 1000 nm or less. The dried resin layer may be cross-linked to provide a more durable layer.

The resin composition layer can be formed by applying the above resin composition, drying the applied composition, and irradiating the composition with light, and optionally thermally curing or photocuring the composition.

After application of the resin composition, the applied composition is preferably dried by a drying process using a hot plate, an IR oven, or a convection oven. The drying conditions can be selected as desired depending on, for example the components of the solvent and the performance of the drying device used. The drying period is selected depending on, for example the components of the solvent and the performance of the drying device used. Usually, the composition is dried at a temperature of from 40° C. to 200° C. for a period of from 15 seconds to 5 minutes and preferably at a temperature from 50° C. to 130° C. for a period of from 30 seconds to 3 minutes.

The resin composition may be cured by irradiating the resin composition with UV or visible light. Examples of the light source include, but not limited to, lamps such as xenon lamps, halogen lamps, tungsten lamps, high-pressure mercury lamps, ultra-high-pressure mercury lamps, metal halide lamps, medium-pressure mercury lamps, low-pressure mercury lamps, carbon arc lamps, fluorescent lamps and sources of laser such as argon ion laser, YAG laser, excimer laser, nitrogen laser, helium-cadmium laser, and semiconductor laser. An optical filter may also be used when the composition is irradiated with light at a certain wavelength.

After irradiation of the applied composition, the composition may be thermally cured. The composition may be cured at a temperature of from 100 to 280° C. and preferably from 150 to 250° C. for a period of from 5 to 60 minutes. The resultant resin composition layer usually has a thickness of 20 nm or more and preferably 50 nm or more and usually 2000 nm or less and preferably 1000 nm or less.

(Step (4) of Removing Unwanted Portions of Resin Composition Layer and Anisotropic Dye Coatings)

The method of the present invention includes the step (4) of removing unwanted portions other than a portion of a pattern and a portion around the perimeter of the pattern, which are to be used as a polarizing element, after formation of the above resin composition layer. The unwanted portions may be partially removed depending on a subsequent production process, and the unwanted portions may be removed by a combination of plural processes.

The anisotropic dye coatings are covered with the resin composition layer, and thus the anisotropic dye coatings do not exhibit side etching and delamination during removal of the unwanted portions, which allows the performance and reliability of the polarizing element to be maintained.

Specific examples of a method for removing the unwanted portions include photolithography, dry etching, sand blasting, and dry ice cleaning. For example, when photolithography is used, a photosensitive resin is used as the resin composition, and the portions other than the pattern and the portion around the perimeter of the pattern are masked, irradiated, and developed to remove the unwanted portions. When photolithography is used, very little residue remains on the removed portions, which can lead to improved adhesion during, for example, sealing a cell.

Examples of light used in the irradiation process include, but not limited to, UV light from, for example, mercury lamps and metal halide lamps and electrons beams.

Examples of an alkali developer for removing the unexposed area by development include sodium solutions such as sodium carbonate and sodium hydroxide; and organic alkalis such as dimethylbenzylamine and triethanolamine. The developer can include, for example, a defoamer and a surfactant.

Examples of a developing process that can be used include shower developing, spray developing, dip (immersion) developing, and puddle (pool) developing.

When dry etching is used, the resin composition need not be photosensitive, and the unwanted portions can be removed by masking the pattern and the portion around the perimeter of the pattern and dry-etching the layer. Examples of a method for masking the pattern and the portion around the perimeter of the pattern include, but not limited to, a method of applying a dry film resist or a photoresist, exposing portions of the resist that are to be used as a mask to light, and developing the resist to create a mask, a method of applying a film or foil that is pre-cut into a mask pattern, a method of applying a film to the entire surface of a substrate and cutting unwanted portions to create a mask pattern, and a method of printing a mask pattern with paste of a mask material by a printing process such as flexographic printing or screen printing.

After dry-etching, the mask applied may be left or removed. Examples of a process for removing the mask include, but not limited to, chemical solvent processes and mechanical means. The mask can be removed simultaneously with removal of the unwanted portions by dry etching.

When dry ice cleaning is used, the resin composition need not be photosensitive, and unwanted portions can be removed by masking the pattern and the portion around the perimeter of the pattern and washing the layer. Unlike the sand blasting, dry ice cleaning does not have a problem of buildup of residual abrasive material and thus facilitates post treatment.

Among them, photolithography is preferred due to its high patterning accuracy, and dry ice cleaning is also preferred due to its high throughput.

Now, embodiments of the present invention will be described with reference to the drawings, although the present invention is not limited to the embodiments. The drawings may not drawn to scale in order to show individual layers and members more clearly.

<Embodiment 1>

FIG. 1 schematically illustrates the step (1) of forming an anisotropic dye coating in the present invention.

An anisotropic dye coating 2 (the shaded area) is continuously applied to a substrate 1. More particularly, a composition for forming the anisotropic dye coating, that includes a dye and a solvent as described above, is applied by, for example, die coating. Stress imparted during the application process provides an ability to induce an alignment to the anisotropic dye coating.

To improve application properties of the composition for forming the anisotropic dye coating, the application surface may be hydrophilized. To improve the ability to induce an alignment, for example, an alignment film may be formed on the substrate, before the anisotropic dye coating is formed.

Figure 2A:
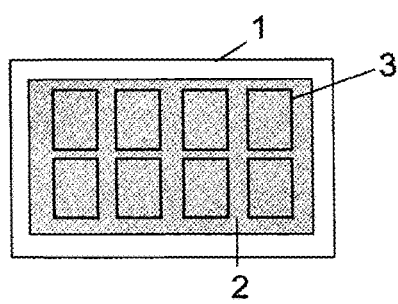
FIG. 2A schematically illustrates removal of the anisotropic dye coating around the perimeter of a pattern from a substrate in Embodiment 1.

FIG. 2A schematically illustrates the step (2) of removing the anisotropic dye coating around the perimeter of a pattern from the substrate in the present invention. Only the anisotropic dye coating around the perimeter of the pattern 3 is removed from the anisotropic dye coating 2 formed on the substrate 1. More particularly, the anisotropic dye coating is removed by drying the anisotropic dye coating and wiping the dried coating with a tape wipe impregnated with a solution to dissolve the anisotropic dye coating.

Figure 2B:
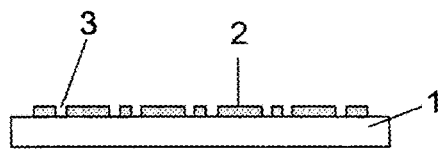
FIG. 2B is a schematic side-view of FIG. 2A.

FIG. 2B is a side view of the substrate illustrated in FIG. 2A. The removal of the anisotropic dye coating around the perimeter of the pattern results in formation of a depression.

Figure 3:
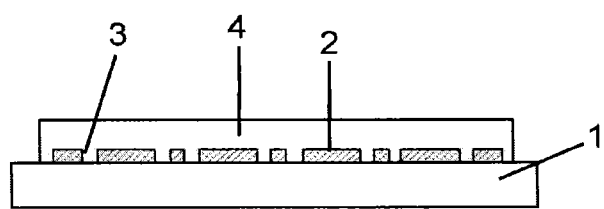
FIG. 3 is a side view illustrating formation of a resin composition layer in Embodiment 1.

FIG. 3 is a side view illustrating the step (3) of continuously applying a resin composition onto the substrate including thereon the anisotropic dye coating, after removal of the anisotropic dye coating around the perimeter of the pattern, in the present invention. More particularly, a photosensitive resin is used as the resin composition as described above and is applied by slot die coating.

A resin composition layer 4 is formed on the anisotropic dye coating 2 and the region around the perimeter of the pattern 3, and thus the resin composition layer 4 is formed on the depression formed by removing the anisotropic dye coating around the perimeter of the pattern. The anisotropic dye coating is covered with the resin composition layer except for the surface that is in contact with the substrate.

Figure 4:
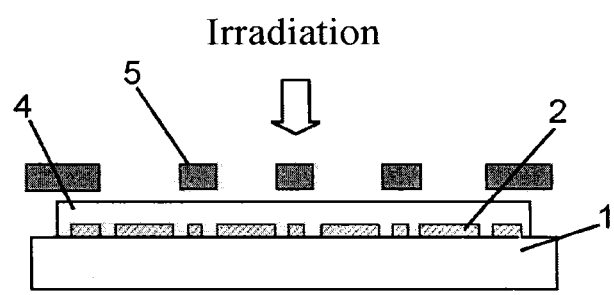
FIG. 4 is a side view schematically illustrates an exposure step in Embodiment 1.

FIG. 4 is a side view schematically illustrating the step (4) of radiating light to remove portions other than the portions including the anisotropic dye coatings and the portions around the perimeter of the pattern, using photolithography, in the present invention. After formation of the resin composition layer 4, only the portions of the resin composition layer 4 having thereunder the anisotropic dye coating and the portions around the perimeter of the pattern are exposed with light so that the anisotropic dye coatings are covered with the resin composition layer except for the surface that is in contact with the substrate. The portions to be removed are covered with a mask 5 to prevent exposure to the light. The portions to be removed can be readily removed in a subsequent development step.

Figure 5:
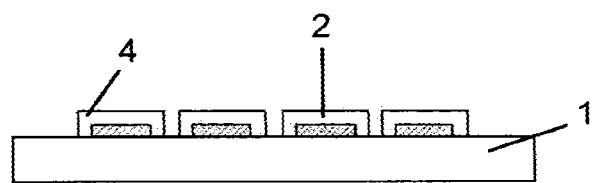
FIG. 5 is a schematic side-view of a polarizing element.

FIG. 5 is a schematic side-view of a polarizing element after the exposure and development processes. The polarizing element includes a pattern of the anisotropic dye coating covered with the resin composition layer. Subsequently, another layer can be formed on the polarizing element, depending on the application.

<Embodiment 2>

In the same manner as in Embodiment 1, an anisotropic dye coating is formed in the step (1) according to the present invention, and the anisotropic dye coating around the perimeter of the pattern is removed from the substrate in the step (2) according to the present invention.

Figure 6:
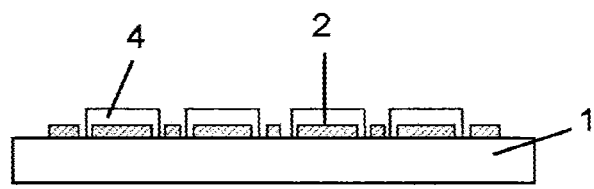
FIG. 6 is a side view illustrating formation of resin composition layers in Embodiment 2.

FIG. 6 is a side view of a substrate including the anisotropic dye coatings and a region around the perimeter of the pattern that are partially covered with a resin composition, for use as a polarizing element, after removal of the anisotropic dye coating around the perimeter of the pattern in the step (3) according to the present invention. More particularly, the resin composition as described above is printed using offset printing to form a pattern.

The resin composition layers 4 are formed on part of the anisotropic dye coatings 2 and a region around the perimeter of the pattern 3, and the part of the anisotropic dye coatings are covered with the resin composition layer, except for the surface that is in contact with the substrate.

In the step (4) according to the present invention, the anisotropic dye coatings that are not covered with the resin composition in FIG. 6 are removed. More particularly, the anisotropic dye coatings are removed by, for example, dry etching, sand blasting, dry ice cleaning, chemical etching, or UV ashing to provide a polarizing element as illustrated by the schematic side-view of the polarizing element of FIG. 5. Subsequently, another layer may be formed on the polarizing element, depending on the application. The anisotropic dye coatings may be removed any time, and the timing of the removal may be selected according to the removal method employed. For example, the anisotropic dye coatings may be removed after application of the resin composition, before drying of the resin composition, or after drying of the resin composition.

<Embodiment 3>

After removing the unwanted portions by photolithography in Embodiment 1, residue remaining after development may be removed by, for example, dry etching, sand blasting, dry ice cleaning, chemical etching, or UV ashing. In this case, the resin composition patterned by photolithography serves as a mask, and thus the residue can be reduced while protecting the anisotropic dye coatings.

<Embodiment 4>

In the same manner as in Embodiment 1, an anisotropic dye coating is formed in the step (1) according to the present invention, and the anisotropic dye coating around the perimeter of a pattern is removed from the substrate in the step (2) according to the present invention. Then, a resin composition is applied to the anisotropic dye coatings using, for example, slot die coating in the step (3) according to the present invention so that the anisotropic dye coatings are entirely covered with the resin composition. Then, the applied composition is cured with heat or UV radiation.

Figure 7:
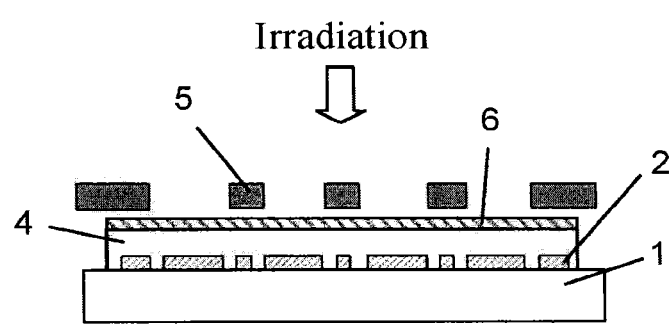
FIG. 7 is a side view schematically illustrates an exposure step in Embodiment 4.

FIG. 7 is a schematic side-view illustrating the step (4) of applying a dry film resist 6 to the cured resin-composition and forming a photoresist layer only on the pattern of the anisotropic dye coatings and a region around the perimeter of the pattern, according to the present invention. In such configuration, the dry film resist can be exposed to light and then developed with an alkali developer to form a photoresist layer on the pattern of the anisotropic dye coatings and a region around the perimeter of the pattern.

Figure 8:
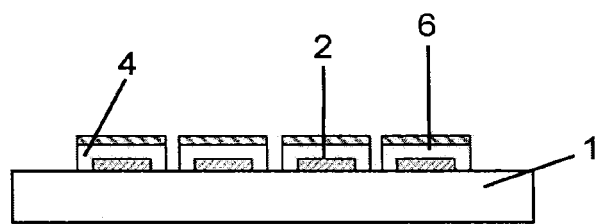
FIG. 8 is a side view of a substrate after formation of a resin composition layer and a photoresist layer in Embodiment 4.

FIG. 8 illustrates the step of using the photoresist layers as a mask and removing the resin composition layer and the anisotropic dye coatings in regions other than the pattern region and the region around the perimeter of the pattern by sand blasting. Finally, the remaining dry film resists 6 are peeled off to give a polarizing element as illustrated by the schematic side-view of the polarizing element of FIG. 5.

<Embodiment 5>

In the same manner as in Embodiment 1, an anisotropic dye coating is formed in the step (1) according to the present invention, and the anisotropic dye coating around the perimeter of a pattern is removed from the substrate in the step (2) according to the present invention. Then, the anisotropic dye coatings are insolubilized. Then, the step (3) and the step (4) according to the present invention are performed in the same manner as in Embodiment 4, and the remaining dry film resists are peeled off to give a polarizing element as illustrated by the schematic side-view of the polarizing element of FIG. 5.

<Embodiment 6>

In the same manner as in Embodiment 5, an anisotropic dye coating is formed in the step (1) according to the present invention, and the anisotropic dye coating around the perimeter of a pattern is removed from a substrate in the step (2) according to the present invention. Then, the anisotropic dye coatings are insolubilized, and the step (3) according to the present invention is performed.

Then, a photoresist (solution) is applied onto the resin composition layer using, for example, slot die coating. FIG. 7 is a schematic side-view illustrating an exposure process for forming a photoresist layer on a pattern of the anisotropic dye coating and a region around the perimeter of the pattern, using photolithography. In such configuration, the photoresist can be exposed to light and then developed with an alkali developer to form a photoresist layer on the pattern of the anisotropic dye coatings and a region around the perimeter of the pattern.

Then, the photoresist layer formed in the step (4) according to the present invention is used as a mask, and the resin composition layer and the anisotropic dye coatings in regions other than the pattern region and the region around the perimeter of the pattern are removed by sand blasting. In the removal process, the photoresist layer is abrasively removed simultaneously to give a polarizing element as illustrated by the schematic side-view of the polarizing element of FIG. 5.

EXAMPLES

[Synthesis of Resin Composition 1]

The components illustrated in Table 1 were mixed and adjusted to a solid content of 15% by weight by addition of propylene glycol methyl ether acetate to give a resin composition 1.

The components illustrated in the table are as follows:
Photopolymerizable monomer a-1: dipentaerythritol hexaacrylate (from Shin-Nakamura Chemical Co., Ltd.)
Resin b-1: Resin corresponding to ZAR 1035 from Nippon Kayaku Co., Ltd. (epoxy (meth)acrylate resin), which is formed by adding acrylic acid to a bisphenol A epoxy resin and adding succinic anhydride and has a molecular weight of 13,000 and an acid number of about 100
Photopolymerization initiator c-1: IRGACURE 907 from BASF Corp.
Surfactant: RS-72-K from DIC Corp. (fluorinated surfactant having a polymerizable group)

TABLE 1

| Resin composition 1 | (Parts by weight) |
|---|---|
| Photopolymerizable monomer a-1 | 47.4 |
| Resin b-1 | 47.4 |
| Photopolymerization initiator c-1 | 5 |
| Surfactant | 0.25 |

Example 1

20 parts by weight of the lithium salt of the dye represented by the following Formula (I), and 1 part by weight of the dye represented by the following Formula (II) were dissolved with stirring in 79 parts by weight of water to prepare a composition 1 for forming an anisotropic dye coating.

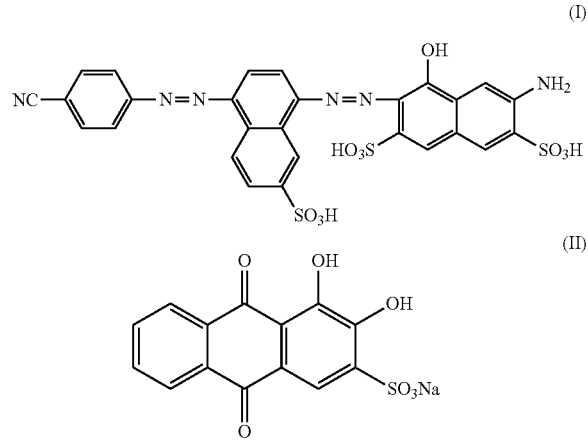

An alignment film (polyimide film having a thickness of 60 nm) was formed on a glass plate (10 cm by 10 cm, thickness of 0.7 mm), and then the plate was rubbed in a direction parallel to the side surfaces to prepare a substrate.

The composition 1 for forming an anisotropic dye coating was applied to the alignment film with a die coater (at a wet film thickness of 2 μm and a head speed of 15 mm/s) and was allowed to dry naturally to form an anisotropic dye coating 1 having a film thickness of about 0.4 μm. Note that the composition 1 was applied at 23° C. and 50 RH %.

Figure 9A:
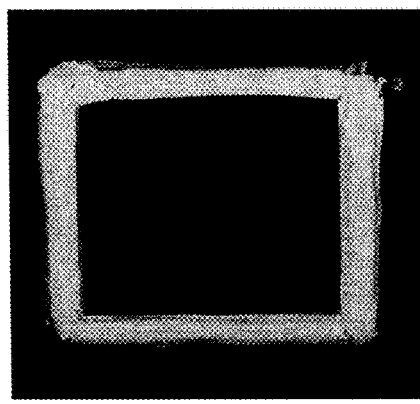
FIGS. 9A and 9B are a view (photograph) of an anisotropic dye coating 1 produced in Example 1.

Next, an about 5 mm wide region around the perimeter (four sides) of a 4 cm×4 cm square, which was to be used as a polarizing element, in the anisotropic dye coating 1 formed as described above was wiped with a cotton swab soaked with pure water. The wiped anisotropic dye coating 1 is illustrated in FIG. 9A.

The resin composition 1 was uniformly applied to the anisotropic dye coating 1 with a brush so that the anisotropic dye coating 1 (on the 4 cm×4 cm square area) and the wiped area (a width of about 2.5 mm) were covered with the composition 1. After application, the substrate was prebaked on a hot plate (at 80° C. for 90 seconds). Next, the composition 1 was photocured with a UV light source (EXF-2829-E ultra-high-pressure mercury lamp from Orc Manufacturing Co., Ltd.) at a dose of 500 mJ/cm². Then the composition was postbaked (at 180° C. for 30 minutes) to completely cure the resin composition 1, thereby forming a resin composition layer 1.

Figure 9B:
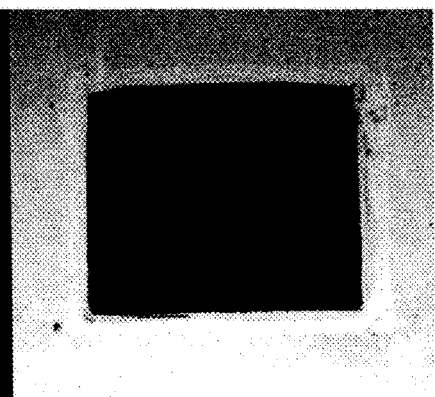

The substrate including thereon the resin composition layer 1 was washed by shaking in demineralized water for 5 minutes. The anisotropic dye coating 1 outside the perimeter of the resin composition layer 1 was removed by dissolution to form a pattern (FIG. 9B). The resin composition layer 1 and the anisotropic dye coating 1 were not peeled, and dissolution of the dye from the anisotropic dye coating 1 was not observed, which indicates that a good polarizing element was obtained.

Even after the substrate including thereon the resin composition layer 1 was wiped with a cloth containing acetone, the resin composition layer 1 and the anisotropic dye coating 1 did not exhibit the delamination and the dissolution.

Comparative Example 1

An anisotropic dye coating 2 was formed in the same manner as in Example 1. Unlike Example 1, the coating was not wiped, and the resin composition 1 was uniformly applied, with a brush, only onto a 4 cm×4 cm square area, which was to be used as a polarizing element, in the anisotropic dye coating 2. After application, the substrate was prebaked on a hot plate (at 80° C. for 90 seconds). Then the composition 1 was photocured with a UV light source (EXF-2829-E ultra-high-pressure mercury lamp from Orc Manufacturing Co., Ltd.) at a dose of 500 mJ/cm². The composition was postbaked (at 180° C. for 30 minutes) to completely cure the resin composition 1, thereby forming a resin composition layer 2.

Figure 10:
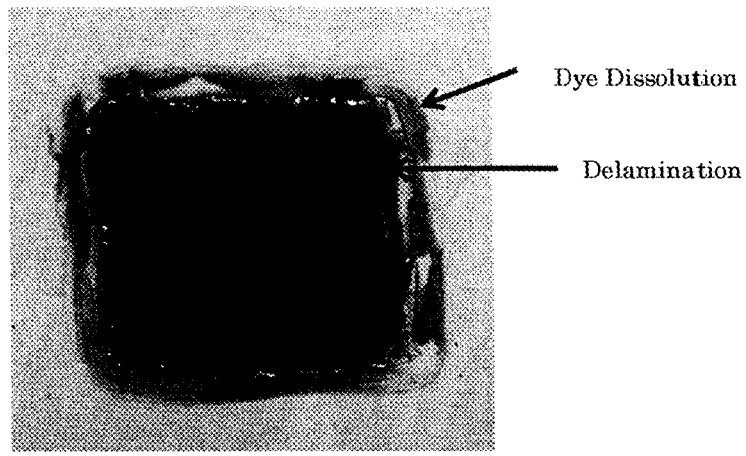
FIG. 10 is a view (photograph) of an anisotropic dye coating 2 produced in Comparative Example 1.

The substrate including thereon the resin composition layer 2 was washed by shaking in demineralized water for 5 minutes. The anisotropic dye coating 2 outside the perimeter of the resin composition layer 2 was removed by dissolution to form a pattern, and at the same time, an end surface of the resin composition layer 2 was peeled as illustrated in FIG. 10. In the delamination area, the dye in the anisotropic dye coating was dissolved out, which caused contamination of the perimeter of the polarizing element.

While the invention has been described in detail and with reference to specific embodiments thereof, it will be apparent to one skilled in the art that various changes and modifications can be made therein without departing from the spirit and scope thereof.

DESCRIPTION OF THE REFERENCE NUMERAL 1 substrate
2 anisotropic dye coating
3 region around perimeter of pattern
4 resin composition layer
5 mask
6 dry film resist or photoresist

The invention claimed is:
1. A polarizing element, comprising:
a substrate,
an anisotropic dye coating, and
a resin composition layer,
wherein the anisotropic dye coating and the resin composition layer are sequentially layered on the substrate,
a top surface and all side surfaces of the anisotropic dye coating are covered with the resin composition layer, and
the anisotropic dye coating and the resin composition layer are not formed on portions of the substrate.
2. The polarizing element according to claim 1, wherein the resin composition layer is optically isotropic.
3. The polarizing element according to claim 1, wherein the resin composition layer has an optical transmission at a thickness of 500 nm and a wavelength of 550 nm of 80% or more.
4. A method for producing a polarizing element that comprises a substrate, an anisotropic dye coating, and a resin composition layer, the method comprising:
forming the anisotropic dye coating on the substrate,
removing parts of the anisotropic dye coating to form plural separate anisotropic dye coatings,
forming the resin composition layer on the anisotropic dye coating with a resin composition, and removing unwanted portions other than a portion of a pattern and a portion around a perimeter of the pattern, after the forming the resin composition layer.

5. The method according to claim 4,
wherein the forming the resin composition layer, comprises continuously applying the resin composition onto a surface of the substrate.

6. The method according to claim 4,
wherein the resin composition is a photosensitive resin composition.

7. The method according to claim 4,
wherein the removing unwanted portions is performed by photolithography.

* * * * *